United States Patent [19]

Liepins et al.

[11] Patent Number: 4,755,326
[45] Date of Patent: Jul. 5, 1988

[54] ELECTRON-DONOR DOPANT, METHOD OF IMPROVING CONDUCTIVITY OF POLYMERS BY DOPING THEREWITH, AND A POLYMER SO TREATED

[75] Inventors: Raimond Liepins; Mahmoud Aldissi, both of Los Alamos, N. Mex.

[73] Assignee: The United States of America as represented by the United States Department of Energy, Washington, D.C.

[21] Appl. No.: 635,020

[22] Filed: Jul. 27, 1984

[51] Int. Cl.$^4$ ................................................ H01B 1/06
[52] U.S. Cl. ...................................... 252/518; 252/500; 524/174; 524/81
[58] Field of Search .................... 252/518; 524/174, 81

[56] References Cited

U.S. PATENT DOCUMENTS

| 4,204,216 | 5/1980 | Heeger et al. | 252/518 |
| 4,321,114 | 3/1982 | MacDiarmid et al. | 252/518 |
| 4,502,980 | 3/1985 | Denisevich et al. | 252/500 |

FOREIGN PATENT DOCUMENTS 8280557 11/1982 France .

OTHER PUBLICATIONS

"Synthesis of Cesium 18–Crown–6: The First Single–Crystal Electrode" J. Am. Chem. Soc., vol. 104, No. 13, 1982.
"Cesium 18–Crown–6 Compounds. A Crystalline Ceside and a Crystalline Electride," J. Am. Chem. Soc., vol. 105, pp. 6490–6491.
"Recent Advances in The Chemistry and Physics of Polyacetylene" Workshop on Molecular Electronic Devices, Naval Research Laboratory, Wash., D.C. 3–81.
"Conducting Plastics are a Step Closer" Los Alamos News Bulletin, Wechler, Lorraine; 4–27–84.
"Electride Doping of Soluble High Temperature Polymers" Mol. Cryst. Liq. Cryst., vol. 105, pp. 151–159, 1984.
"Conducting Polymers" Mahmoud Aldissi, 8–24–83.
"Conducting Polymers" Mahoud Aldissi, 2–83.
"Semiconductor Properties of Polyacetylene" Appl. Phys., vol. 51, No. 8, p. 4252, 8–80, Ozaki et al.
"Cadium Sulfide Polyacetylene Photovoltaic Heterojunction," Fourth Photovoltaic Solar Energy Conf., 5–82, Cadene et al.
"Synthesis of Soluble Conducting Polymers–Polyacetylene and Polyaromatics," J. Chem. Soc. Comm., 9–83, Aldissi et al.

Primary Examiner—Josephine L. Barr
Attorney, Agent, or Firm—Joseph M. Hageman; Paul D. Gaetjens; Judson F. Hightower

[57] ABSTRACT

Polymers with conjugated backbones, both polyacetylene and polyaromatic heterocyclic types, are doped with electron-donor agents to increase their electrical conductivity. The electron-donor agents are either electride dopants made in the presence of lithium or dopants derived from alkalides made in the presence of lithium. The dopants also contain a metal such as cesium and a trapping agent such as a crown ether.

17 Claims, No Drawings

ELECTRON-DONOR DOPANT, METHOD OF IMPROVING CONDUCTIVITY OF POLYMERS BY DOPING THEREWITH, AND A POLYMER SO TREATED

BACKGROUND OF THE INVENTION

The present invention relates generally to an electron-donor agent used to improve the electrical conductivity of polymers, and also the electrically conductive material produced by such doping. More particularly this invention relates to an electride dopant or a dopant derived from an alkalide, both made in the presence of lithium and both containing a trapping agent and cesium, used as an electron-donor agent. This invention is a result of a contract with the Department of Energy (Contract No. W-7405-ENG-36).

Polymers, such as polyaromatic, heterocyclic polymers with a conjugated backbone, have been known as nonconductors of electricity. But it has also been known that these polymers could be rendered more conductive by the use of dopants, both electron-donor and electron-acceptor types. U.S. Pat. No. 4,204,216, discloses the use of a metal dopant whose Pauling electronegativity value is no greater than 1.6, to increase the conductivity of polyacetylene to that characteristic of metallic behavior. Among the metals suggested for use was cesium. However, when an alkali metal, specifically sodium, is used as a dopant in a liquid ammonia solution, the temperature for carrying out the procedure must be kept at $-78°$ C. in order for the liquid ammonia solution to be stable. This low temperature requires special procedures and also slows the diffusion of the dopant into the polyacetylene film. U.S. Pat. No. 4,321,114, discloses the use of cesium metal to act as an n-type dopant to increase the conductivity of a conjugated polymer. The doping procedure described in this patent involved, in the case of an n-type dopant, the use of an electrolytic cell in which external current was necessary to initiate electrochemical reaction or electron transfer involving the polymer. However the patent cautioned that the electrical potential must be sufficiently low so as not to produce electrochemical degradation of the polymer. Finally, French Patent Application Publication No. 2,505,854, shows the use of such dopant agents as electrolyte solutions of lithium cations in such suitable solvents as tetrahydrofuran, dimethylformamide or dimethyl sulfoxide. The polymers so doped included polyquinoline and other polymers made from radicals of 6-membered nitrogen-containing units.

A need still existed for a method of doping polymers, especially polyaromatic, heterocyclic polymers with dopants that did not require excessively low temperatures. While doping could be accomplished at these low temperatures, because of the low diffusion rate of the dopant into the formed polymer at such low temperatures, the process was difficult and expensive. In addition, the conductivity of the resultant doped polymer was, at room temperature, low and the polymer material often began degrading. In addition, the polymer material when exposed to moisture or oxygen in the air, if conductivity measurements were conducted in the air, resulted in the immediate degradation of the polymer.

SUMMARY OF THE INVENTION

An object of this invention is to provide a stable electron-donor agent that can be used to increase the conductivity of polymers with conjugated backbones, especially polyaromatic, heterocyclic polymers.

A further object of this invention is to provide a method for electron-donor doping polymers that does not depend upon excessively low temperatures and long diffusion times to accomplish doping.

Another object of this invention is to provide an electrically conductive polyaromatic, heterocyclic polymeric material resulting from the doping of such polymers with an electron-donor agent comprising an electride dopant or a dopant derived from an alkalide, both of which are made in the presence of lithium and both of which contain a trapping agent.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, this invention may comprise:

an electron-donor agent comprising an electride dopant or a dopant derived from an alkalide, both of which are made in the presence of lithium and both of which contain a trapping agent.

The present invention may also comprise, in accordance with its objects and purposes, an electrically conductive material comprising a polymer with a conjugated backbone, electron-donor doped to a controlled degree with an agent comprising either an electride dopant or a dopant derived from an alkalide, both of which are made in the presence of lithium and both of which contain a trapping agent.

The present invention additionally may also comprise, in accordance with the objects and purposes, a method of electron-donor doping a polymer to form an electrically conductive material comprising:

dissolving a trapping agent, lithium, and an alkali metal in a solvent to form a stable electride dopant or a dopant derived from an alkalide;

contacting the formed polymer with a conjugated backbone with either dopant formed in the previous step for a definite length of time;

removing the unreacted dopant from the formed polymer; and drying the electrically conductive material.

In a preferred embodiment of the invention the alkali metal is cesium and the electrides or alkalides are cesium electrides or alkalides.

The foregoing description of the preferred embodiments of the invention have been presented for purposes of illustration and description. It is not intended to be exhaustive or to limit the invention to the precise form disclosed, and obviously many modifications and variations are possible in light of the above teaching.

By using the method of the invention, a more stable, more resistant to degradation, electrically conductive polymer is provided. It is no longer necessary to dope the formed polymer at an extremely low temperature of $-78°$ C. for a lengthy period of time to insure diffusion of the dopant throughout the formed polymer mass. Finally by using a trapping agent, such as a crown ether, in the electride or alkalide, the conductivity of the electron-donor doped polymer is improved.

DETAILED DESCRIPTION OF THE INVENTION

In their unmodified state polymers, particularly polyaromatic, heterocyclic polymers or polyacetylene, are nonconductors of electricity. The room temperature conductivity of films of polyacetylene varies from $10^{-5}$ ohm$^{-1}$cm$^{-1}$ for the trans form to the $10^{-9}$ ohm$^{-1}$cm$^{-1}$ for the cis form. However, doping with electron-donor dopants can raise this conductivity by 7 to 11 orders of magnitude. However, the problem of rapid degradation of both the polymer structure and conductivity after doping requires that the conductivity measurements be made in an inert atmosphere. One such measurement technique is the 2-probe technique in a dry box argon atmosphere.

The electron-donor agents of this invention are electride dopants or dopants derived from alkalides, both of which are made in the presence of lithium and both of which contain a trapping agent. An electride can be defined as a salt in which the anion is a trapped electron that is not attached to an individual atom or molecule in the compound to form a conventional anion. The trapped electrons may undergo spin pairing or even a "dielectron" formation. However the essential feature is that the electrons are not attached to atoms or molecules. An alkalide can be defined as a salt in which the anion is the alkali metal anion. The use of lithium in the synthesis of these compounds leads to more stable compounds. The most useful electride and alkalide found so far are those that contain cesium in the following forms:

Cs$^+$(18C6)$_2$e$^-$ which is the cesium electride, and
Cs$^+$(18C6)$_2$Cs$^-$ which is known as cesium ceside which is an alkalide.

The exact mechanism of doping when a ceside is used is not completely understood. One possibility is that when ceside is used as a dopant, it is useful only after it converts into a cesium electride before reacting with the formed polymer. In the same way, other alkalides with metals other than cesium might also have to convert into electrides before being able to modify the formed polymers into conductors of electricity.

The above two examples of an electride or alkalide both contain the trapping agent, 18C6, which is a crown ether. The presence of trapping agents generates solutions in which large concentrations of solvated electrons are formed at the expense of metal atoms and metal ions. Therefore solutions used for doping will contain high concentrations of free (solvated) electrons. One particular type of trapping agent which is a crown ether is the compound 1, 4, 7, 10, 13, 16-hexaoxacyclooctadecane.

Other trapping agents can be useful in the formation of stable alkalides and electrides. These other compounds and sample structures are as follows:

cryptands

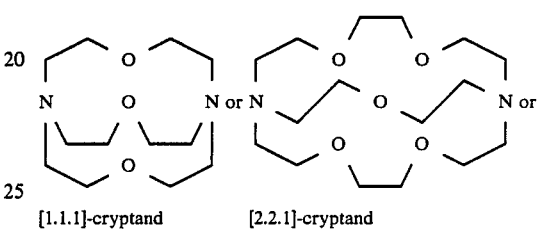

[1.1.1]-cryptand   [2.2.1]-cryptand

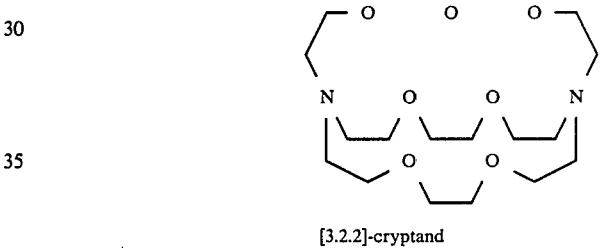

[3.2.2]-cryptand methyl ether cyclodextrin

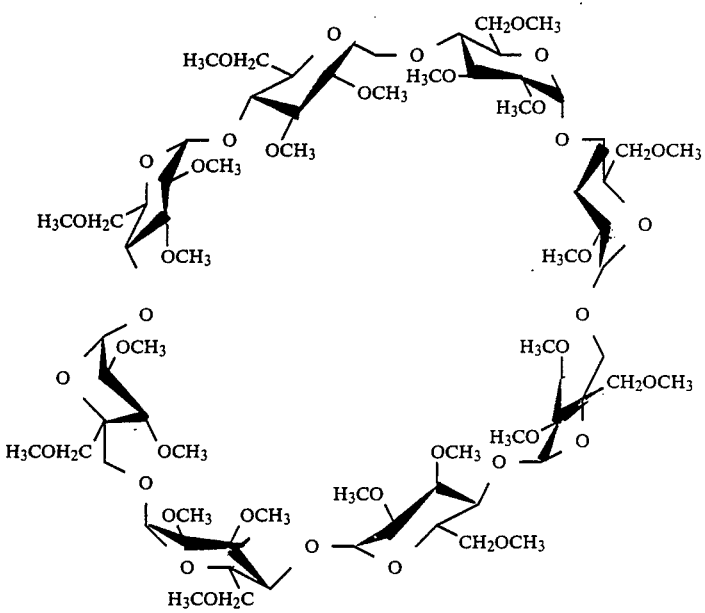

spherands

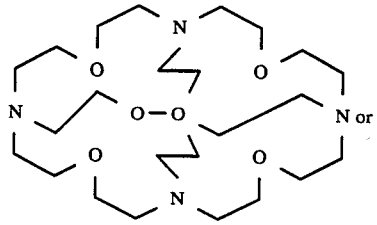

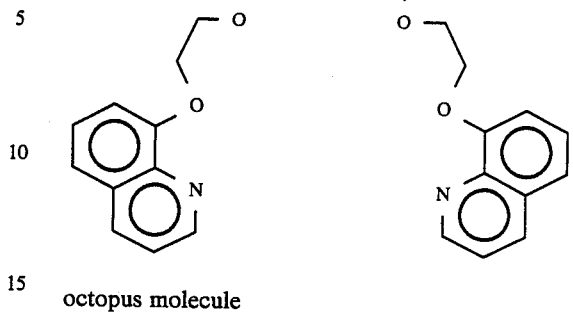

octopus molecule

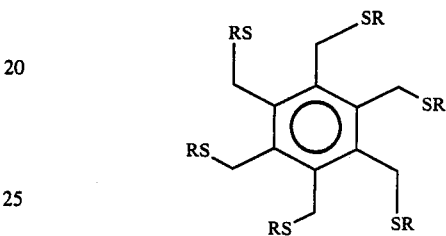

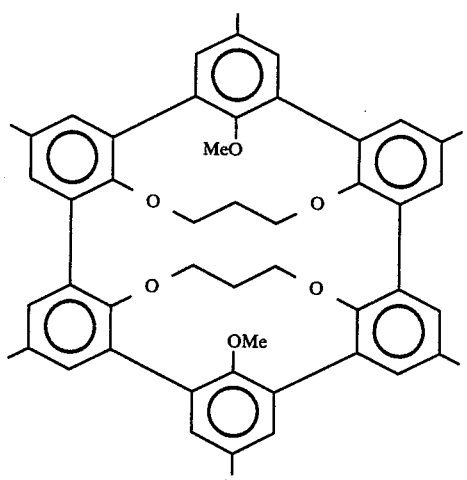

methyl ether calixarene

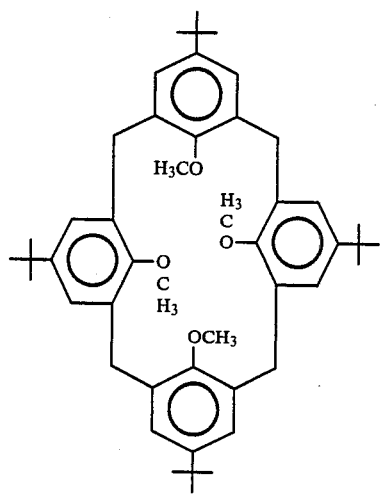

podand

Although the only metal mentioned so far for use in the electron-donor dopant has been cesium, other alkali metals may be used. These other metals include: Li, Na, K, Rb. It has also been found that to make a more stable electride or alkalide, lithium should be used in the systhesis. The value of greater stability of the electride or alkalide is that the doping process can be carried on at relatively higher temperatures. When doping processes are carried out at lower temperatures, it is necessary to expose the material to the dopant a longer time to allow diffusion of the dopant throughout the mass of the material. At a relatively higher temperature, diffusion, if the dopant solution remains stable and does not decompose, is relatively swifter and the doping process can be carried out in an hour's time. Instead of $-78°$ C. necessary to keep liquid ammonia stable, the inventive doping method can be completed at $-20°$ C. in one hour.

The polymer material to be doped should have a conjugated backbone. It is thought that the conjugated backbone is involved in the conduction of electricity. Polymers other than polyacetylene, particularly polyaromatic, heterocyclic polymers, have been found to be suited for doping with the electron-donor dopants of this invention. The following two structures for pyrrones have been found to be suitable for forming electrically conductive material:

PYRRONE I

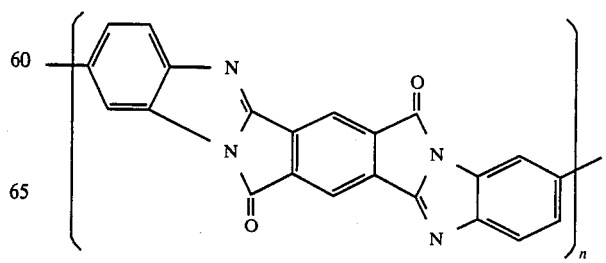

PYRRONE II

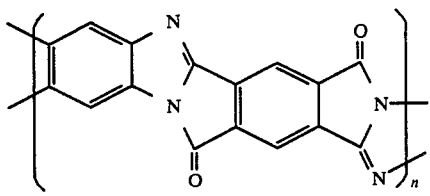

The pyrrone I structure has also been found to give different conductivity measurements depending upon the curing temperature. Preferably the curing temperature should be either 250° C. or 350° C. It is thought that the higher curing temperature causes more crosslinking between the polymer chains, and hence the greater crosslinking gives lower conductivity. Another polymer of interest is:

POLYPHENYLQUINOXALINE

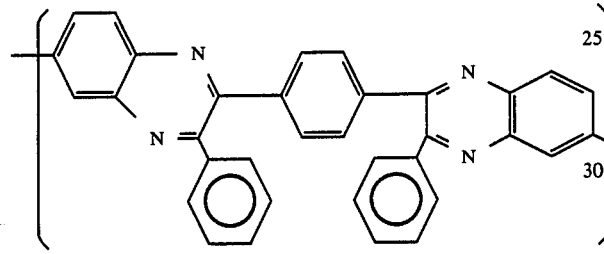

Other polymers with conjugated backbones that may be doped to form electrically conductive material include polyquinoxalines, polybenzimidazoles, polybenzoxazoles, polybenzthiazoles, polyoxadiazoles, polybenztriazoles, and polysulfodiazoles.

EXAMPLE I

Polymer Preparation

Pyrrone I. Pyromellitic dianhydride (Princeton Chemical Research) was sublimed through a fiberglass fabric onto a cold finger in a sublimator at 200°/0.05 mm. A colorless sublimate, mp 286°–287° C. was obtained.

3,3'-Diaminobenzidine (Burdick and Jackson Laboratories, Inc.) was recrystallized from a 2:1 mixture of water and acetonitrile after treatment with charcoal to yield a light tan powder, heated up to 176° C., after vacuum drying for two days.

Dimethylacetamide (E. I. duPont de Nemorus and Co., Inc.) was received under $N_2$ and distilled from pyromellitic dianhydride before use.

The polymer was prepared by adding 95 ml of dimethylacetamide solution of pyromellitic dianhydride (12.9 g in 100 ml, 0.04M) to a stirred, hot (~60° C.) dimethylacetamide solution of 3,3'-diaminobenzidine (8.56 g. in 100 ml, 0.04M) in a preheated high-speed blender under $N_2$. After 30 minutes of stirring the remainder (5 ml) of the dimethylacetamide solution of pyromellitic dianhydride was added. The stirring and heating were continued for one hour and then the polymer dope was centrifuged. The supernatant was decanted off and stored under $N_2$ in a refrigerator. The intrinsic viscosity of the polymer dope was 1.0 dl/g in dimethylacetamide.

Film Preparation

The film preparation consisted of diluting the polymer dope solutions to 5–10% solids content, casting the solution on an optical glass plate in a laminar flow hood. After the film was cast, gentle heat was applied from a hot plate for about two hours. After that the plates were placed in a vacuum oven (~1 hour) at 45° C./12 hours, then at 100° C./3 hours and then 250° C./4 hours. The film was stripped from the glass plate by submerging it in a water bath. The film was then dried in air at 250° C. for four hours. The film had a tensile strength of 10–15 kpsi and elongation of 25–35%.

Doping Procedure

The doping procedure is conducted in a high vacuum (at least $10^{-5}$ torr) glass system. The doping solution is prepared by dissolving in liquid methylamine an equimolar amount of lithium and the crown ether, 18C6, and a half molar amount of cesium in liquid methylamine. The methylamine is distilled under vacuum from the cylinder into a glass container, is degassed and then distilled over the metals and the crown ether. The solution is kept at $-20°$ C. or lower so that the methylamine is in the liquid phase. The deep blue color, characteristic of electrides, is noticed immediately upon the distillation of the solvent over the solid components. Before the polymer film was dipped into the doping solution it was dried under dynamic vacuum at ~100° C. for about half an hour and then kept in a dry box in a highly purified argon atmosphere for three days. The film was then dipped into the electride solution for one hour at $-20°$ C. Then the doping solution was decanted, the film was rinsed with methylamine and dried in the vacuum system.

Conductivity Measurements

The conductivity measurements were conducted in a dry box using a two-probe technique. The color of the cured film was typically brown-red. After doping the color of the film changed to black with a metallic luster to it.

Curing of the Pyrrone film at a higher temperature (350° C.) in air leads to a decrease in conductivity by some two orders of magnitude. Chemically, the polymer would be expected to be highly crosslinked under these oxidizing curing conditions. Please see Table 1 for results.

EXAMPLE II

Pyrrone II. Tetraaminobenzene tetrahydrochloride (Burdick and Jackson Laboratories, Inc.) was purified by dissolving in the minimum amount of water, treated with charcoal, and reprecipitated with concentrated hydrochloric acid. Since 1,2,4,5-tetraaminobenzene is extremely susceptible to air oxidation, polymers from this tetramine were prepared using the tetrahydrochloride salt. Dimethylformamide was purified by distillation from phosphorus pentoxide.

The polymer was prepared by adding a dimethylformamide solution of pyromellitic dianhydride (4.36 g, 0.04M in 40 ml) dropwise to a stirred slurry of tetraaminobenzene tetrahydrochloride in dimethylformamide and pyridine (5.68 g, 0.02M; 35 ml DMF and 6.32 g, 0.08M pyridine) in a high-speed blender under $N_2$. The stirring was then continued for half an hour. The polymer was precipitated with aqueous ethanol and washed with acetone to remove pyridine hydrochloride. The polymer was then redissolved in dimethylformamide or hexamethylphosphoramide for intrinsic viscosity determination and film casting. Typical intrinsic viscosity in dimethylformamide was 0.60 dl/g.

The film preparation, doping procedure, and conductivity measurements were made as in Example 1. Please see Table 1 for results.

EXAMPLE III

Polyphenylquinoxaline. Para-bis(phenylglyoxalyl)benzene was prepared according to the known procedure. The polymer was prepared by adding the para-bis(phenylglyoxalyl)benzene powder (10.27 g, 0.03M) to a stirred (high-speed blender) slurry of 3,3'-diaminobenzidine (5.36 g, 0.025M) in a 1:1 mixture of m-cresol and xylene (40 ml). Additional solvent (13 ml) was used to wash down the residual tetracarbonyl reactant and the mixture was stirred at R.T. for 16 hours. For viscosity determination a portion of the solution was poured into methanol in a high-speed blender, the precipitated solid was boiled in methanol and dried at 130° C. in a vacuum oven overnight. Typical inherent viscosity in sulfuric acid was 2.0 dl/g.

The film preparation, doping procedure, and conductivity measurements were done as in Example 1. Please see Table I for results.

TABLE I

Conductivities of Cesium Electride and Alkalide Doped Polymers

| Polymer | Film Thickness $\mu m$ | Conductivity $(\Omega cm)^{-1}$ | Color of Doped Film |
| --- | --- | --- | --- |
| Polyacetylene | 100 $\mu m$ | 200 | Bright Purple |
| Pyrrone I cured at 250° C. | 50 $\mu m$ | 20 | Black |
| Pyrrone I cured at 350° C. | 50 $\mu m$ | 0.2 | Black |
| Pyrrone II | 100 $\mu m$ | 2 | Black |
| Polyphenylquinoxaline | 100 $\mu m$ | 20 | Black |

EXAMPLE IV

The alkalide dopant solution is prepared by dissolving equimolar amounts of cesium metal, trapping agent, and lithium. The cesium metal is used as is, the lithium foil is scraped with a razor blade to remove the oxide, and the crown ether is distilled under vacuum. The methylamine is distilled under vacuum from the cylinder into a glass container, then degassed before distilling it over the metals and the crown ether. The solution is kept below −20° C. so that the methylamine is in the liquid phase. The weights used of the components are 1.329 gm Cs, 2.64 gm 18C6, and 0.07 gm Li. All three components are dissolved in 10 ml $CH_3NH_2$.

The same procedures as in Example I are used for film preparation, doping procedure, and conductivity measurements. The conductivity measurements, which are the same as those reported in Example I, are reported in Table 1.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. The electrically conductive material comprising a polymer with a conjugated backbone selected from the group consisting of polyacetylene, polypyrrone, and polyphenylquinoxaline, said polymer being electron-donor doped to a controlled degree with an agent derived from an electride dopant or a dopant derived from an alkalide both of which contain a trapping agent being selected from the group consisting of: a crown ether, 1,4,7,10,13,16-hexaoxacyclooctadecane, cryptand, methyl ether cyclodextrin, spherand, methyl ether calixarene, podand, and an octopus molecule, said agent being made in the presence of lithium.

2. The electrically conductive material of claim 1, wherein the electride or alkalide contains cesium.

3. The electrically conductive material of claim 1, wherein the trapping agent is a crown ether.

4. The electrically conductive material of claim 3, wherein the crown ether trapping agent is 1,4,7,10,13,16-hexaoxacyclooctadecane.

5. The electrically conductive material of claim 1, wherein the trapping agent is a cryptand.

6. The electrically conductive material of claim 1, wherein the trapping agent is a methyl ether cyclodextrin.

7. The electrically conductive material of claim 1, wherein the trapping agent is a spherand.

8. The electrically conductive material of claim 1, wherein the trapping agent is a methyl ether calixarene.

9. The electrically conductive material of claim 1, wherein the trapping agent is a podand.

10. The electrically conductive material of claim 1, wherein the trapping agent is an octopus molecule.

11. The electrically conductive material of claim 1, wherein the polymer is polyacetylene.

12. The electrically conductive material of claim 1, wherein the polymer is polypyrrone.

13. The electrically conductive material of claim 12, wherein the polypyrrone has the following structure:

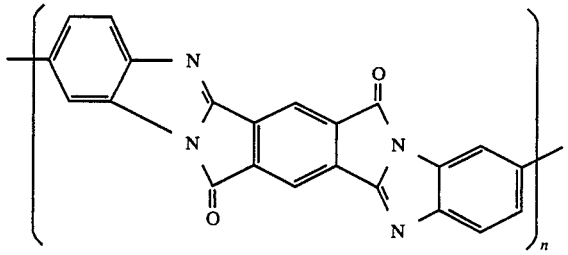

14. The electrically conductive material of claim 13, wherein the polymer is cured at 250° C.

15. The electrically conductive material of claim 13, wherein the polymer is cured at 350° C.

16. The electrically conductive material of claim 12, wherein the polypyrrone has the following structure:

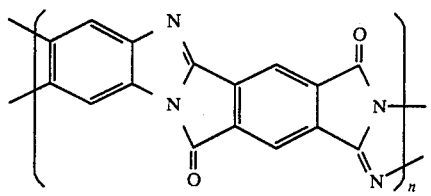

17. The electrically conductive material of claim 1, wherein the polymer is polyphenylquinoxaline.

* * * * *